United States Patent
McCarthy

(10) Patent No.: US 7,312,393 B2
(45) Date of Patent: Dec. 25, 2007

(54) ELECTRICAL AND COMMUNICATIONS RECEPTACLE FOR FURNITURE

(75) Inventor: David G. McCarthy, Huntington, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 329 days.

(21) Appl. No.: 10/768,590

(22) Filed: Jan. 30, 2004

(65) Prior Publication Data

US 2005/0167138 A1  Aug. 4, 2005

(51) Int. Cl.
*H01R 13/46* (2006.01)

(52) U.S. Cl. ............... 174/53; 174/58; 174/480; 174/500; 220/3.2; 220/3.3

(58) Field of Classification Search .......... 174/59, 174/53, 67, 58, 57, 480, 481, 50, 483, 488, 174/500, 490, 484, 486, 487, 66; 220/3.2–3.9, 220/4.02; 439/574, 488, 535, 131; 248/906; 312/223.3, 223.2, 223.6

See application file for complete search history.

(56) References Cited

U.S. PATENT DOCUMENTS

| | | | | |
|---|---|---|---|---|
| 4,178,468 A | * | 12/1979 | Jorgensen et al. | 174/48 |
| 4,372,629 A | * | 2/1983 | Propst et al. | 312/223.6 |
| 4,792,881 A | * | 12/1988 | Wilson et al. | 361/827 |
| 5,122,069 A | * | 6/1992 | Brownlie et al. | 174/53 |
| 5,231,562 A | * | 7/1993 | Pierce et al. | 361/832 |
| 5,342,993 A | * | 8/1994 | Siems | 174/481 |
| 5,575,668 A | * | 11/1996 | Timmerman | 174/482 |
| 5,980,279 A | * | 11/1999 | Muller | 174/489 |
| 6,133,531 A | * | 10/2000 | Hayduke et al. | 174/67 |
| 6,802,577 B2 | * | 10/2004 | Gershfeld | 312/223.3 |

* cited by examiner

*Primary Examiner*—Angel R. Estrada
(74) *Attorney, Agent, or Firm*—Mark P. Stone

(57) ABSTRACT

A box for electrical and communication receptacles is mounted in an opening in a furniture unit, and in particular, the top surface of an office conference table. The box has an opened top, and a cover is pivotably mounted to the opened top and movable between an opened position for providing access to the electrical and communications receptacles within the box, and a closed position in which access to within the box is restricted. The electrical receptacles within the box are coupled to an external source of electrical power by an electrical cord, and the communication receptacles within the box are coupled to external communication lines. The box is electrically grounded by the electrical cord coupling the box to the external source of electrical power. A wire is coupled between a surface of the grounded box and the pivotable cover to be in permanent engagement with the pivotable cover for providing continuous electrical grounding of the cover. The cover is pivotably mounted to the box so that it cannot be pivoted into an opened position at an angle greater than substantially 45 degrees relative to the top surface of the box so that the cover will automatically assume its closed position, as a result of gravitational forces, when no opposing force is applied to the cover.

19 Claims, 2 Drawing Sheets

ELECTRICAL AND COMMUNICATIONS RECEPTACLE FOR FURNITURE

BACKGROUND OF THE INVENTION

The present invention is directed to a box for housing electrical receptacles and communications ports. The box is mounted to an opening cut from a furniture unit, preferably the top surface of an office conference table. A cover is pivotably mounted to the opened top surface of the box, and is movable between opened and closed positions. Means are provided for supplying external electrical power to the electrical receptacles within the box, and for coupling the communication ports within the box to external communication lines. Portable electrical, electronics and communication equipment, such as computers, facsimile machines, telephones and lighting equipment on the top of the table, can be coupled to the electrical receptacles and communication ports within the box when the cover is in its opened position. The cover is thereafter closed to provide a substantially continuous table top surface after the equipment on the table top has been coupled to the electrical receptacles and communications ports in the box mounted within the table. The cover is dimensioned such that a gap is defined between the box and the end of the cover remote from the pivot to permit passage of the cords coupling the electrical and communications equipment on the top of the table to the electrical receptacles and communication ports within the box when the cover is in its closed position.

Typical electrical receptacle and communication port boxes of the type described above are marketed by Electri-Cable Assemblies, Inc. of Shelton, Conn. under the trademark INTERFACE. It is the primary object of the present invention to provide improvements to the known table mounted boxes. These improvements will be discussed as follows in conjunction with the accompanying drawings.

SUMMARY OF THE INVENTION

An opened top box or pan having a cover pivotably mounted to the opened top is mounted within an opening cut from a unit of furniture, preferably the top surface of a conference table. Electrical receptacles and communication ports are provided within the box. The electrical receptacles within the box are coupled to an external source of electrical power by an electrical cord plugged into a wall mounted electrical outlet, while the communication ports within the box are coupled to external communication line through a transmission line coupled to the box. The cover is pivotably mounted to the top of the box so that it is movable between a closed position in which the top of the cover is flush with the top of the table in which the box is mounted, and an opened position in which access is provided to the electrical receptacles and communication ports within the box. The hinge connecting the pivotable cover to the box is designed with a stop element to prevent the cover from pivoting at an angle greater than substantially 45 degrees relative to the top surface of the box. In this manner, when no opposing force is applied to the cover, it will assume its closed position as a result of gravitational forces acting thereon. Therefore, the cover cannot be inadvertently left in its opened position, and will be in its closed position at all times other than when it is purposely opened. In this manner, if any liquid is spilled on the table top, the closed cover will prevent much of the spilled liquid from entering the box and the electrical receptacles therein.

The box is grounded as a result of the ground wire in the electrical cord coupling the electrical receptacles within the box to the external source of electrical power. In a further aspect of the present invention, a wire is connected to the grounded box at one end, and to the cover at the other end for continuously engaging the cover, thereby continuously grounding the cover. Preferably, the grounding wire is connected to the cover at the hinged end of the cover.

DESCRIPTION OF THE BEST MODES FOR CARRYING OUT THE INVENTION

Figure 1:
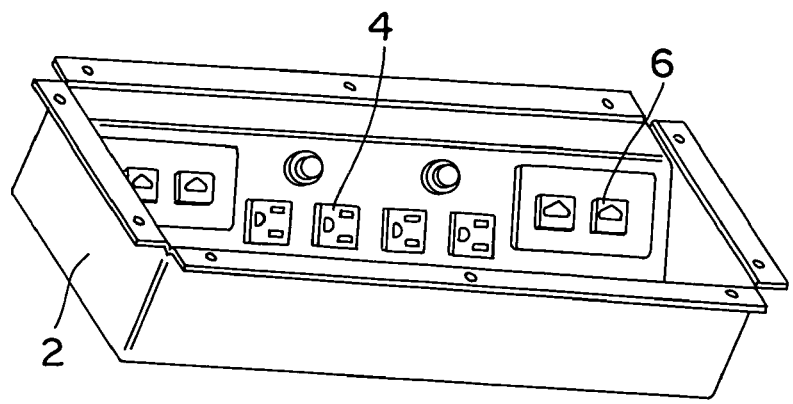
FIG. 1 illustrates a known box for electrical receptacle/communication ports without a cover mounted to it.

FIG. 1 illustrates a known opened top box generally designated by reference numeral 2. A plurality of electrical receptacles designated by reference numeral 4, and a plurality of communication ports designated by reference numeral 6, are mounted within the box 2.

Figure 2:
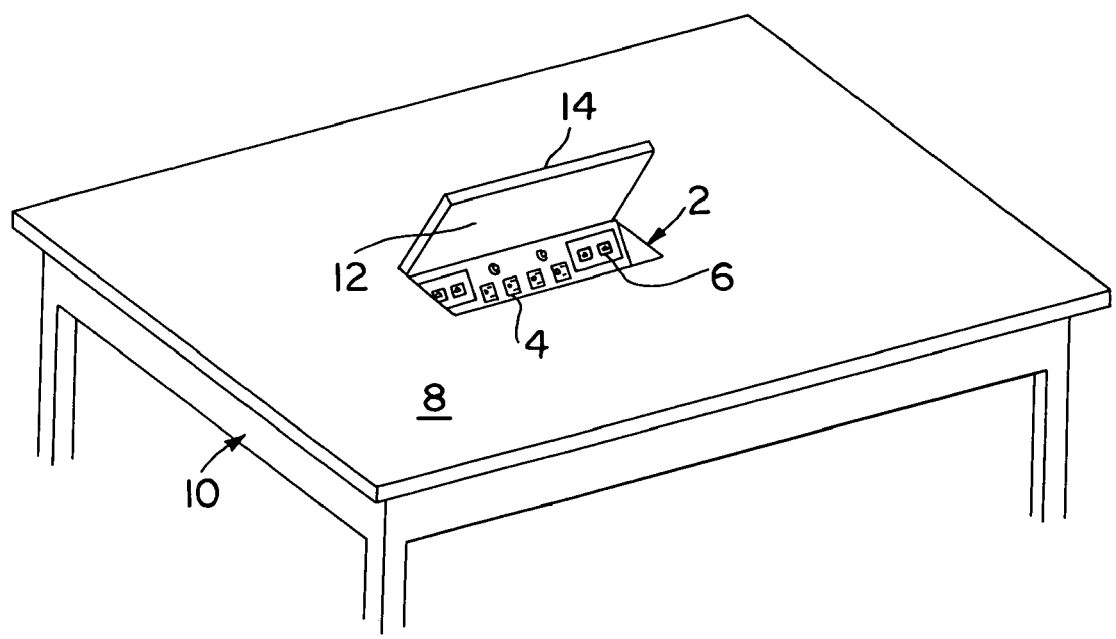
FIG. 2 schematically illustrates the box illustrated by FIG. 1 received within a cutout opening on the top surface of a table, with a cover for the box pivoted into an opened position.

FIG. 2 illustrates the box 2 shown in FIG. 1, mounted within an opening in the top surface 8 of a table generally designated by the reference numeral 10. The box 2 has a cover 12 pivotably mounted to one end thereof, and the cover 12 is shown in its opened position in FIG. 2. In its closed position, the top of the cover 12 is flush with the top surface 8 of the table 10. When the cover 12 is in its opened position as illustrated by FIG. 2, electrical and communications equipment, such as lamps, telephones, facsimile machines supported on the table top 8, can be plugged into the electrical receptacles 4 and the communication ports 6 within the box. Once the equipment is plugged into the receptacles and ports, the cover 12 is pivoted into its closed position. The end of the cover 14 remote from the end of the cover pivoted to the box 2 is dimensioned so that a gap is defined between the cover end 14 and the forward end 16 of the box 2. This gap provides clearance for the electrical cords and communication transmission lines plugged into the electrical receptacles 4 and the communication ports 6 within the box 2, when the cover 12 is pivoted into its closed position. In this manner, the cover is flush with the table top and the cords and lines pass through the relatively small gap defined between the end of the cover and the box.

Figure 3:
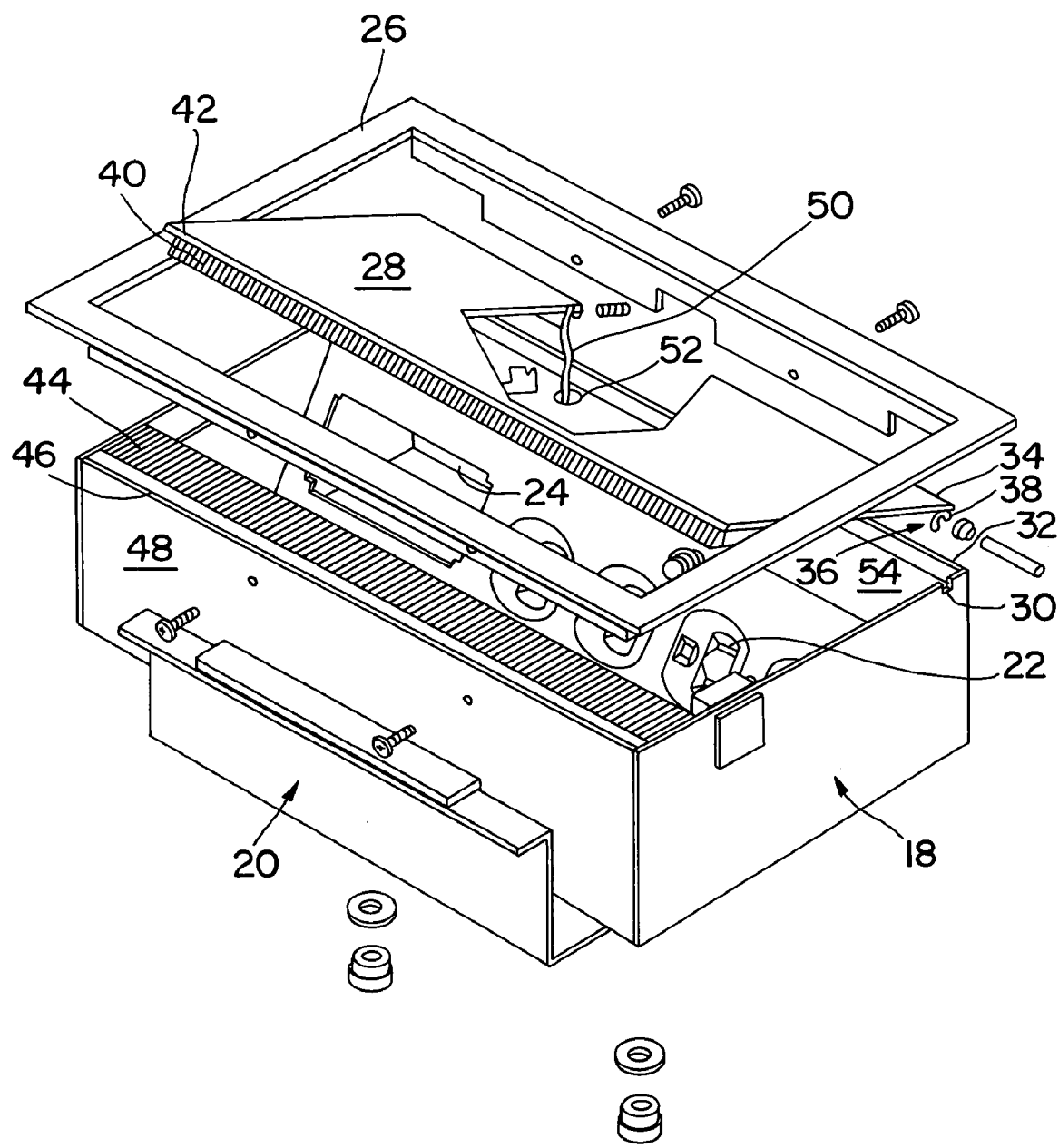
FIG. 3 is an exploded perspective view of the improved box for electrical receptacles and communication ports in accordance with the present invention.

FIG. 3 illustrates the improvement to the table mounted box for the electrical receptacles and communication ports in accordance with the present invention. The box, generally designated by reference numeral 18, is mounted within an opening cut from a furniture unit, such as a table top, by a bracket generally designated by reference numeral 20. A plurality of electrical receptacles 22, and a plurality of communication ports 24, are provided within the box 18. Means for coupling the electrical receptacles 22 to an external source of electrical energy (i.e., a wall outlet) such as an electrical cord extending through an opening in the bottom of the box 18, is not shown in the drawing. Similarly, transmission lines for coupling the communication ports 24 to a standard communications wall receptacle through an opening in the box 18, are not shown in the drawing.

A frame 26 is mounted around the perimeter of the opened top surface of the box 18, and a cover 28 is pivotably mounted to the box 18 in a notch 30 defined near the top of a rear end 32 of the box 18. The rear end 34 of the cover 28 defines a hinge 36 integrally extending downwardly from the cover 28. The integral hinge 36 defines a stop 38 which prevents the cover 28 from being pivoted at an angle greater than 45 degrees relative to the opened top surface of the box 18. The maximum angular inclination of the cover 28 relative to the top surface of the box 18 is variable by adjusting the orientation of the stop element 38 of the hinge 36 relative to the rear wall 32 of the box 18. Preferably, the maximum elevation will be 45 degrees or less so that the cover 28 assumes its closed position, as a result of gravitational forces, unless a positive opposing force is exerted on the cover to hold it in its opened position.

A vertical brush 40 formed from a plurality of separate bristles extends downwardly from the front end 42 of the cover 28. A horizontal brush 44, formed from a plurality of separate bristles, extends rearwardly into the box 18 from the top 46 of the front wall 48 of the box 18. The cover 28 is dimensioned such that a gap is defined between the front end 42 of the cover 28 and the front end 46 of the box 18 when the cover is pivoted into its closed position in which the cover 28 is flush with the top of the table in which the box 18 is mounted. When the cover 28 is closed, the gap defined between the front end 42 of the cover and the front end 46 of the box is partially sealed by the intersecting brushes 40 and 44. However, the bristles on the brushes permit electrical cords plugged into the electrical receptacle 22, and communication lines plugged into the communication ports 24, to extend through the gap between the cover and the box to permit electrical and communications equipment on the table top to remain plugged into the receptacles 22 and ports 24 when the cover 28 is closed.

In accordance with the present invention, unless the cover 28 is purposely held in an opened position, it will assume the closed position as a result of gravitational forces. In its closed position, the cover 28 is flush with the table top in which the box is mounted, and seals a substantial portion of the opened top surface of the box 18. The intersecting brushes 40 and 44 partially seal the gap defined between the front end of the cover and the front end of the box. Therefore, unless the cover is purposely being held in its opened position, the opened top of the box 18 will, at all times, be almost entirely sealed by the cover and the intersecting brushes to prevent liquid from flowing into the box and the electrical receptacles therein in the event that liquid is spilled on the table top in which the box is mounted.

In a further aspect of the present invention, a ground wire, designated by reference numeral 50, is attached, at one end to the lower surface of the cover 28, and at the other end to a portion of the box 18. The ground wire 50 extends through an opening designated by reference numeral 52 defined in a rear ledge 54 of the box 18. Preferably the ground wire 50 is coupled to the bottom surface of the cover 28 near the rear end 34 of the cover to avoid stretching of the wire 50 when the cover 28 is pivoted into its opened position. The box 18 is grounded by the ground wire in the electrical cord coupling the electrical receptacles 22 with an external source of electrical power. Therefore, the cover 28 is grounded as a result of its connection to the grounded box 18 through the ground wire 50. Preferably, the ground wire is permanently connected to the box and the cover so that the cover is continuously grounded by the grounded box.

The improvements discussed herein enhance the overall safety of the receptacle box by reducing the possibility that liquid spilled on the table top in which the box is mounted will flow into the electrical receptacles within the box, and by positively grounding the cover which is pivotably mounted to the opened top of the box.

Other features and modifications to the improved receptacle box described herein within the scope of the present invention will become apparent to those skilled in the art. Therefore, the discussion of the preferred embodiments herein is intended to be illustrative only, and not restrictive of the scope of the invention, that scope being defined by the following claims and all equivalents thereto.

The invention claimed is:

1. A box having an opened top and adapted to be mounted in an opening defined in an article of furniture;
   at least one electrical receptacle provided in said box;
   a cover pivotably mounted to the opened top of the box, said cover being movable between an opened position and a closed position; and
   means for preventing said cover from pivoting at an angle of substantially 45 degrees or greater relative to the opened top of the box;
   wherein said cover will assume said closed position as a result of gravitational forces in the absence of an opposing force exerted thereon.

2. The box as claimed in claim 1, wherein said cover is pivotably mounted to said box by a hinge, and
   said means for preventing comprises a stop element on said hinge.

3. The box as claimed in claim 2, wherein said hinge and said stop element defined on said hinge are integrally formed with said cover.

4. The box as claimed in claim 1, wherein said cover is flush with a top surface of said article of furniture in which said box is mounted when said cover is in said closed position.

5. The box as claimed in claim 4, wherein said cover is dimensioned such that a gap is defined between a front end of said cover and a front end of said box when said cover is in said closed position.

6. The box as claimed in claim 5, further including a brush extending from said front end of said cover.

7. The box as claimed in claim 5, further including a brush extending from said front end of said box and into said gap defined between said front end of said cover and said front end of said box.

8. The box as claimed in claim 5, further including a first brush extending from said front end of said cover, and a second brush extending from said front end of said box and into said gap defined between said front end of said cover and said front end of said box.

9. The box as claimed in claim 8, wherein said first and second brushes are oriented such that said first and second brushes intersect when said cover is in said closed position.

10. A box having an opened top and adapted to be mounted in an opening defined in an article of furniture,
    at least one electrical receptacle provided in said box,
    means for electrically grounding said box,
    a cover pivotably mounted to the opened top of said box, said cover being movable between an opened position and a closed position, and
    means for electrically coupling said cover to said box for electrically grounding said box,
    wherein said means for electrically coupling includes a ground wire connected at one end thereof to said box, and at the other end thereof to said cover.

11. The box as claimed in claim 10, wherein said cover is pivotably mounted to said box by a hinge defined on the cover, and said ground wire is connected to said cover in close proximity to said hinge.

12. The box as claimed in claim 11, wherein said ground wire is connected to said hinge.

13. A box having an opened top and adapted to be mounted in an opening defined in an article of furniture,
at least one electrical receptacle provided in the box,
means for electrically grounding said box,
a cover pivotably mounted to the opened top of said box, said cover being movable between an opened position and a closed position,
means for preventing said cover from pivoting at an angle of substantially 45 degrees or greater relative to said opened top of the box such that said cover will assume said closed position as a result of gravitational forces in the absence of an opposing force exerted thereon; and
means for electrically coupling said cover to said box for electrically grounding said cover.

14. The box as claimed in claim 13, wherein said cover is pivotably mounted to said box by a hinge, and
said means for preventing comprises a stop element on said hinge.

15. The box as claimed in claim 14, wherein said hinge and said stop element defined thereon are integrally formed with said cover.

16. The box as claimed in claim 13, wherein said cover is dimensioned such that a gap is defined between a front surface of said cover and a front end of said box when said box is in said closed position, and
a brush extending from said front end of said box and into said gap.

17. The box as claimed in claim 16, further including a brush extending from said front end of said cover, said brush extending from said front end of said cover being oriented such that it intersects with said brush extending from said front end of said box when said cover is in said closed position.

18. The box as claimed in claim 13, wherein said means for electrically coupling includes a ground wire connected at one end thereof to said box, and at the other end thereof to said cover.

19. The box as claimed in claim 18, wherein said cover is pivotably mounted to said box by a hinge on said cover, and said ground wire is connected to said cover in close proximity to said hinge.

* * * * *